(12) United States Patent
Wu

(10) Patent No.: US 6,386,704 B1
(45) Date of Patent: May 14, 2002

(54) SUNGLASSES

(76) Inventor: Huei-Min Wu, 87, Yu Hsin 1st Street, Tainan City (TW)

(*) Notice: Subject to any disclaimer, the term of this patent is extended or adjusted under 35 U.S.C. 154(b) by 0 days.

(21) Appl. No.: 09/780,086

(22) Filed: Feb. 9, 2001

(51) Int. Cl.$^7$ ................................................ G02C 1/04
(52) U.S. Cl. ........................ 351/106; 351/109; 351/149
(58) Field of Search .................. 351/44, 103, 105–109, 351/149, 154

(56) References Cited

U.S. PATENT DOCUMENTS 5,903,331 A * 5/1999 Lin ............................. 351/105
6,208,030 B1 * 8/2001 Chen ........................... 351/86

* cited by examiner

Primary Examiner—Huy Mai
(74) Attorney, Agent, or Firm—Alan Kamrath; Rider, Bennett, Egan & Arundel, LLP

(57) ABSTRACT

A sunglasses comprising a U-shaped frame having a slot in either end, a groove at the underside having a length substantially the same as frame, a nose pad, a first recess adjacent the nose pad, and a second recess above the first recess; an integrally formed lens having a latched piece in either end and a flexible latched member having a substantially conic shape conformed to the recesses on the top central portion wherein the top edge of the lens, the latched member, and the latched pieces are clung to the groove, the second recess through the first recess, and slots respectively; and a pair of temples. The set of sunglasses is more simplified in components and thus assembly. Further, the stability is enhanced due to the additional securing of the latched member in the second recess.

16 Claims, 3 Drawing Sheets

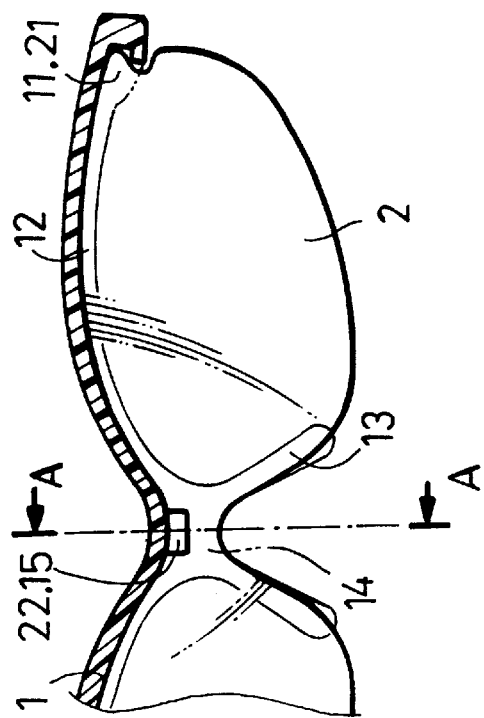
FIG. 3
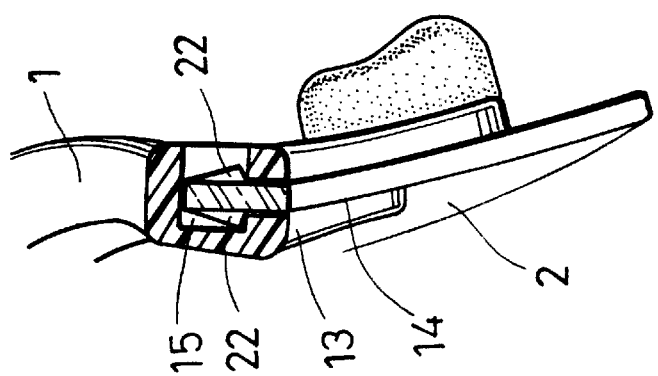
A-A FIG. 4

SUNGLASSES

FIELD OF THE INVENTION

The present invention relates to sunglasses and more particularly to a sunglasses with improved characteristics.

BACKGROUND OF THE INVENTION

A set of conventional sunglasses is shown in FIG. 1 comprising a U-shaped frame 10 having a central recessed bridge 101, a groove 102 at the underside having a length substantially the same as frame 10, and a slot 103 in either end; an integrally formed tinted lens 20 having a latched piece 201 in either end with the top edge of lens 20 and latched pieces 201 being clung to the groove 102 and slots 103 respectively; a pair of temples 30 pivotably secured to the ends of frame 10; and a nose pad 40 having a raised T-shaped member 401 clung onto the bridge 101. It is advantageous for being simple in components and assembly. But this is unsatisfactory for the purpose for which the invention is concerned because components, assembly, and stability can be still further simplified and enhanced respectively.

SUMMARY OF THE INVENTION

It is an object of the present invention to provide a sunglasses comprising a U-shaped frame having a slot in either end, a groove at the underside having a length substantially the same as the frame, a nose pad, a first recess adjacent the nose pad, and a second recess above the first recess; an integrally formed lens having a latched piece in either end and a flexible latched member having a substantially triangular shaped cross sections conformed to the recesses on the top central portion wherein the top edge of the lens, the latched member, and the latched piece are clung to the groove, the second recess through the first recess, and slots respectively; and a pair of temples. The set of sunglasses is more simplified in components and thus assembly. Further, the stability is greatly enhanced due to the additional securing of the latched member in the second recess.

The above and other objects, features and advantages of the present invention will become apparent from the following detailed description taken with the accompanying drawings.

BRIEF DESCRIPTION OF THE DRAWINGS

FIG. 3 is a partial perspective view in part section illustrating the mounted lens on frame; and FIG. 4 is sectional view taken along line A—A of FIG. 3.

DETAILED DESCRIPTION OF THE PREFERRED EMBODIMENTS

Figure 1:
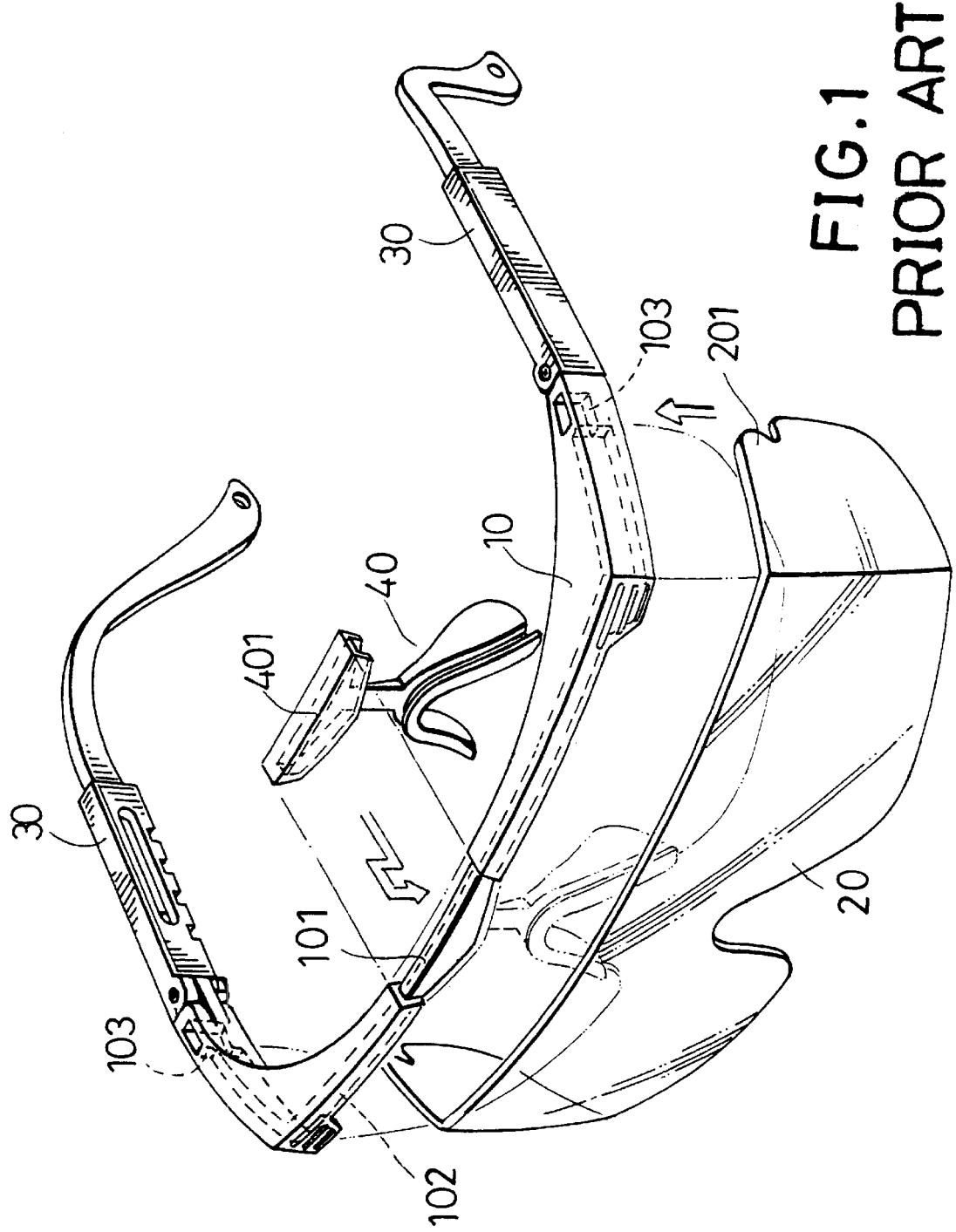
FIG. 1 is an exploded perspective view of a conventional sunglasses.
Figure 2:
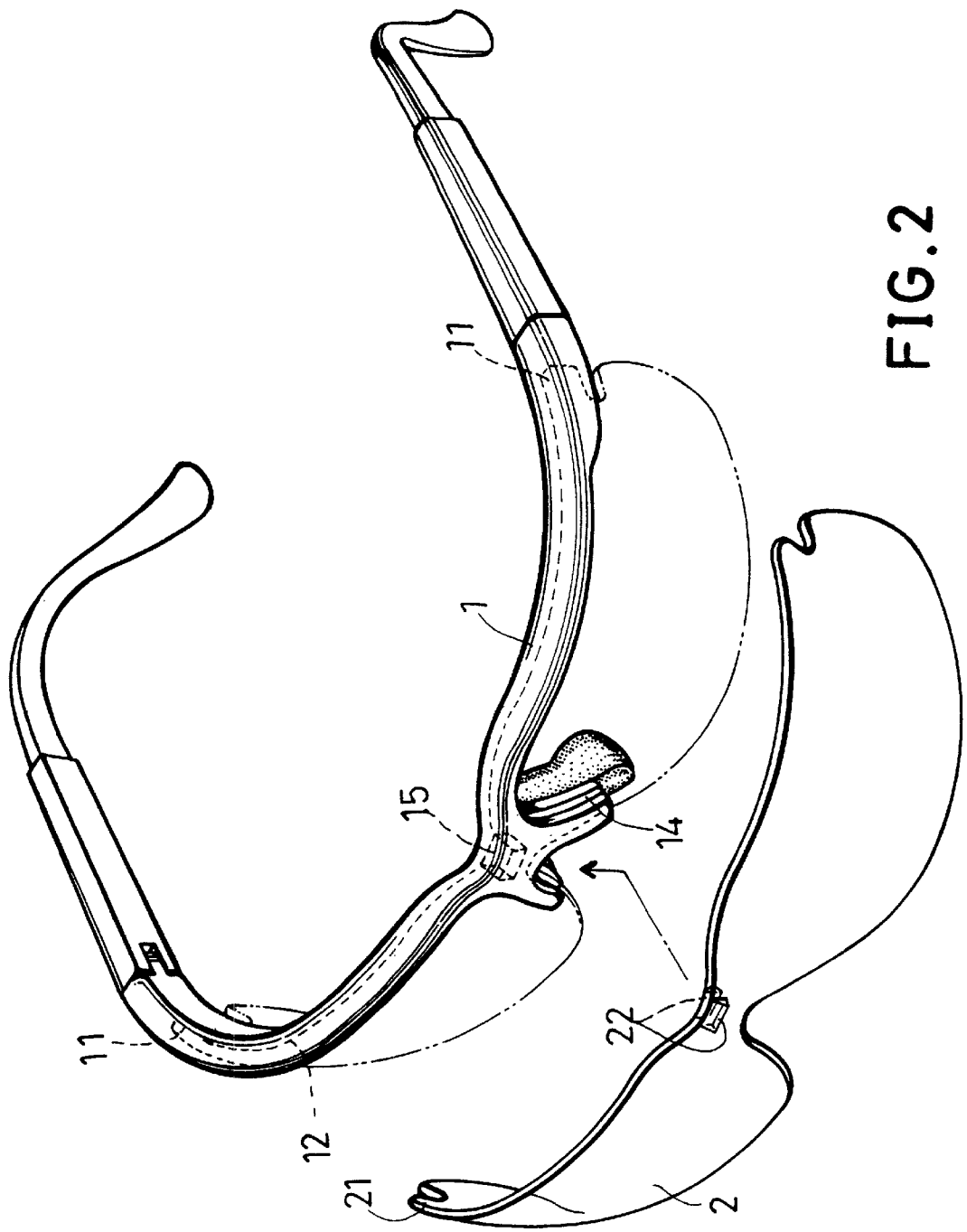
FIG. 2 is an exploded perspective view of sunglasses according to the invention.

Referring to the drawings, there is shown sunglasses constructed in accordance with the invention comprising a U-shaped frame 1 having a slot 11 in either end, a groove 12 at the underside having a length substantially the same as frame 1, a nose pad 13, a first recess 14 adjacent the nose pad 13, and a second recess 15 above the first recess 14. An integrally formed tinted lens 2 has a latched piece 21 in either end and a flexible latched member 22 conformed to the recesses 14 and 15 and on the top central portion of the lens 2. The top edge of the lens 2 is clung to the groove 12. The latched member 22 is clung to the second recess 15 (through the first recess 14 adjacent to the nose pad 13 and having a width for slideably receiving the thickness of the central portion of the lens 2 when the top central portion is inserted therein in an insertion direction and when the latched member 22 is received in the second recess 15) (as indicated by arrow in FIG. 2). The latched pieces 21 are clung to the slots 11. The flexible latched member 22 extends beyond the first and second faces defining the thickness of the central portion of the lens 2 and has an increasing size and preferably has triangular shaped cross sections in the insertion direction beyond both the first and second faces of the central portion of the lens 2. A pair of temples (not numbered) are pivotably secured to the ends of frame 1.

It is understood that, as compared with prior art, the invention is more simplified in components and thus assembly. Most importantly, the stability is greatly enhanced due to the additional securing of the latched member 22 in the second recess 15.

While the invention has been described by means of specific embodiments, numerous modifications and variations could be made thereto by those skilled in the art without departing from the scope and spirit of the invention set forth in the claims.

What is claimed is:

1. Sunglasses comprising, in combination:

a U-shaped frame having a nose pad;

a lens having a central portion having a thickness, with the central portion including a latched member extending beyond the thickness of the central portion;

a first recess in the U-shaped frame adjacent to the nose pad of a width for slideably receiving the thickness of the central portion of the lens; and a second recess in the U-shaped frame above the first recess for receiving the latched member of the central portion of the lens, with the latched member being insertable through the first recess into the second recess and with the central portion being receiving in the first recess when the latched member is in the second recess.

2. The sunglasses of claim 1, with the central portion having a first face and a second face, with the thickness being the first and second faces, with the latched member extending beyond the first face of the central portion.

3. The sunglasses of claim 2, with the latched member being inserted through the first recess in an insertion direction and having an increasing size in the insertion direction.

4. The sunglasses of claim 3, with the latched member having triangular shaped cross sections in the insertion direction.

5. The sunglasses of claim 2, with the latched member also extending beyond the second face of the central portion.

6. The sunglasses of claim 5, with the latched member being inserted through the first recess in an insertion direction and having an increasing size in the insertion direction.

7. The sunglasses of claim 6, with the latched member having triangular shaped cross section in the insertion direction beyond both the first and second faces of the central portion.

8. The sunglasses of claim 1, with the U-shaped frame including a groove at an underside and having a length substantially equal to the frame, with the lens including a top edge clung to the groove of the U-shape frame.

9. The sunglasses of claim 8, with the U-shaped frame including at least one end having a slot, with the lens having at least one end having a latched piece received in the slot of the frame.

10. The sunglasses of claim 9, with the lens being integrally formed.

11. The sunglasses of claim 10, further comprising in combination, a pair of temples.

12. The sunglasses of claim 1, with the U-shaped frame including at least one end having a slot, with the lens having at least one end having a latched piece received in the slot of the frame.

13. The sunglasses of claim 12, with the lens being integrally formed.

14. The sunglasses of claim 13, further comprising, in combination a pair of temples.

15. The sunglasses of claim 1, with the lens being integrally formed.

16. The sunglasses of claim 15, further comprising, in combination, a pair of temples.

* * * * *